United States Patent [19]

Kitai et al.

[11] 4,167,848

[45] Sep. 18, 1979

[54] DRIVING DEVICE FOR AN ELECTRIC TIMEPIECE

[75] Inventors: Kiyoshi Kitai, Tokyo; Masuo Ogihara, Chiba; Kozo Sato, Yotsukaido; Nobuo Shinozaki, Chiba; Yoichi Seki, Shisui; Yusuru Takazawa, Togane, all of Japan

[73] Assignee: Seiko Koki Kabushiki Kaisha, Japan

[21] Appl. No.: 927,871

[22] Filed: Jul. 25, 1978

Related U.S. Application Data

[63] Continuation-in-part of Ser. No. 686,114, May 13, 1976, abandoned.

[30] Foreign Application Priority Data

May 14, 1975 [JP] Japan ................................. 50-57103

[51] Int. Cl.² .............................................. G04B 19/30
[52] U.S. Cl. .................................. 58/23 D; 310/103;
310/83; 310/114; 310/49 R
[58] Field of Search .......... 318/136; 310/41, 162–165,
310/103, 114, 117, 94, 124, 83; 58/23 D, 25 R,
116 R, 125 R, 85.5

[56] References Cited

U.S. PATENT DOCUMENTS

| | | | |
|---|---|---|---|
| 3,041,513 | 6/1962 | Reiches | 318/136 |
| 3,523,204 | 8/1970 | Rand | 310/94 |
| 3,790,833 | 2/1974 | Hasebe | 310/103 X |
| 3,863,084 | 1/1975 | Hasebe | 310/126 |
| 4,037,400 | 7/1977 | Kitai et al. | 58/23 D |
| 4,084,403 | 4/1978 | Kitai et al. | 58/23 D |
| 4,104,859 | 8/1978 | Ogihara et al. | 360/49 X |

Primary Examiner—Donovan F. Duggan
Attorney, Agent, or Firm—Robert E. Burns; Emmanuel J. Lobato; Bruce L. Adams

[57] ABSTRACT

A driving device including a magnetized driving rotor mounted for rotation within a magnetic field produced in a coreless coil, and, in order to make the magnetic pole of said driving rotor deviate by a definite angle relative to the magnet field direction of said coil, a supplementary magnetized rotor mounted for rotation outside of the coil and magnetically coupled with the driving rotor. And the supplementary rotor is provided with magnetic poles, the number thereof being greater than the number of poles of said driving rotor. The driving rotor has an odd number of pole pairs.

5 Claims, 6 Drawing Figures

DRIVING DEVICE FOR AN ELECTRIC TIMEPIECE

RELATED APPLICATION

This application is a continuation-in-part application of prior copending application Ser. No. 686,114, filed May 13, 1976 and now abandoned.

BACKGROUND OF THE INVENTION

The present invention relates to a step motor used for an electric timepiece wherein a timepiece hand is moved intermittently every unit time (to be called step movement hereafter).

In a known electric timepiece, when, for example, a second-hand is made to undergo step movement, a step motor, an electromagnetic solenoid and other related structure is generally used. However, the former step motor is generally complicated in construction, and a particular signal such as a two-phase signal is required as the motor input signal. With the latter electromagnetic solenoid, although the input signal is simple, the electric power consumption is very high and this limits its usefulness as a driving device of an electric timepiece wherein a battery is used as the electric power source.

The applicants have previously proposed a driving device as shown in FIG. 1, enabling elimination of the defect mentioned above. In the device previously proposed by the applicants the first rotor and the second rotor make a rotation of 180° at each unit time when effecting a step-movement of the hands. There is, however, a difficulty in using the device, especially for a small-sized clock, in the fact that if the second-hand is step-moved at the above rotation angle, for example, the reduction ratio of a wheel train will become 1:30, resulting in enlarging the second-hand wheel or an intermediate gear wheel, or requiring an extra reduction gear wheel.

OBJECT OF THE INVENTION

It is an object of the present invention to provide a highly efficient electric driving device.

DESCRIPTION OF THE PREFERRED EMBODIMENTS

Figure 1A:
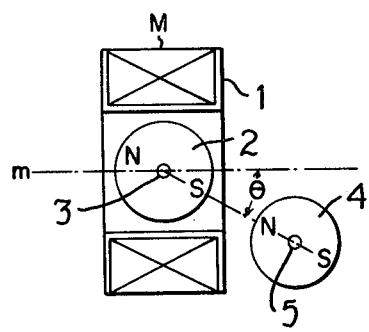
FIGS. 1(a) and 1(b) illustrate a known electric driving device.
Figure 1B:
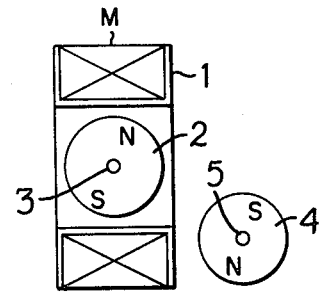
Figure 2:
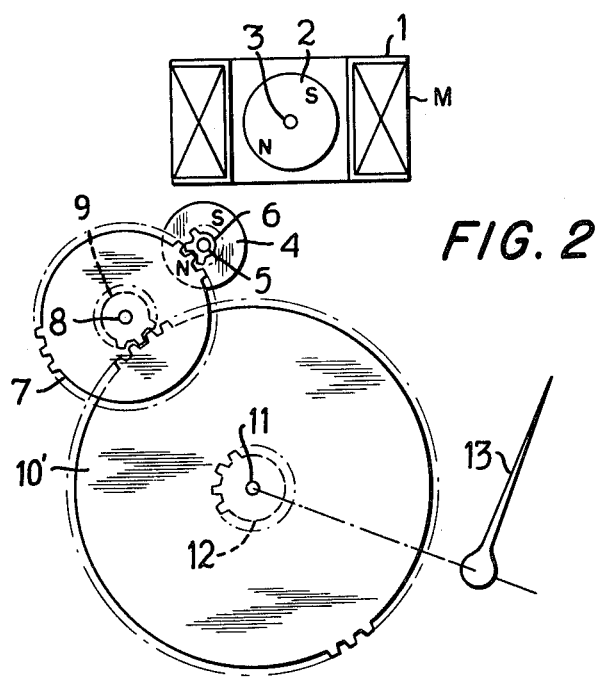
FIG. 2 illustrates the driving device illustrated in FIGS. 1(a) and 1(b) incorporated in a timepiece.

FIGS. 1 and 2 show a device previously proposed by the applicants and the structure of an electric timepiece in which the device is incorporated. In FIG. 1, (M) is a coreless field coil wound on a winding frame (1) and which produces a magnetic flux in the magnetic field central direction (m) in the drawing, when an excitation current is impressed. Elements (2) and (4) are a first rotor and a second rotor comprised of a permanent magnet magnetized with two poles N, S in the diametral direction. The first rotor (2) is rotatably supported on a shaft (3) defining an axis of rotation within the hollow part of said coreless field coil (M), while the second rotor (4) is rotatably supported on a shaft (5) defining an axis of rotation at a position offset by an angle $\theta$ from the said magnetic field central direction (m).

Now, in case an excitation current is not applied to said coreless field coil (M), the first rotor (2) and the second rotor (4) are brought to rest at a position as shown in FIG. 1(a) with poles or opposite magnetic polarity next to each other. Then, when an excitation current is applied to said coreless field coil (M), a magnetic flux is produced in the magnetic field central direction (m) of the coreless field coil (M). By the interaction between this magnetic flux and the magnetic flux produced by the first rotor (2), the first rotor (2) produces a rotational force. The rotation direction at this time is determined by the angle $\theta$ between the second rotor (4) and the magnetic field central direction (m), and a rotation force occurs clockwise as shown by an arrow in FIG. 1. When the first rotor (2) starts to rotate, the second rotor (4) begins to rotate counterclockwise due to the magnetic force of attraction with the first rotor (2). As the rotation force increases gradually, the first rotor (2) and the second rotor (4) develop an inertial force, and when they pass such a positional relation as shown in FIG. 1(b), the magnetic force of attraction between the N-pole of the first rotor (2) and the S-pole of the second rotor (4) increases, and the rotors come to rest at a positional relation as shown in FIG. 1(a). At this time, there has occurred a change of phase of 180° in the positional relation of the magnetic poles, that is, the N-pole of the first rotor (2) and the S-pole of the second rotor (4) attract and are next to each other. If an excitation current is applied to the coreless field coil (M) in the direction reverse to the above, each rotor will rotate in a direction opposite to the direction mentioned above. In this way, by alternately applying positive and negative excitation currents to the coreless field coil (M) at each unit time, a stepwise rotation of 180° increments will be brought about.

An electric timepiece wherein such a driving device is incorporated is shown in FIG. 2. The numerals the same as in FIG. 1 indicate the same parts. In FIG. 2, (6) is a first pinion set at the second rotor (4), and (7) is an intermediate gear wheel that engages with the first pinion (6). The element (8) is a shaft, (9) is a second pinion set at the intermediate gear wheel (7), (10) is a second-hand wheel, (11) is a second-hand shaft, and (13) is a second-hand. The element (12) is a third pinion set at the second-hand wheel. In the figure, the gear wheels and pinions of the minute-hand and hour-hand are omitted.

Now, as described before, if the second rotor (4) rotates through 180° every second in synchronism with the rotation of the first rotor (2), the second-hand (13) will have to perform a movement of 6° per second, so that the reduction ratio of the wheel train from the first pinion (6) down to the second-hand must be set at 1:30. In the case of FIG. 2, this reduction ratio is obtained by setting the ratio of the first pinion (6) to the intermediate gear wheel at 1:5 and the ratio of the second pinion (9) to the second-hand gear wheel (10) at 1:6. It was, therefore, inevitable that the second-hand wheel becomes large, and particularly in the arrangement of a small-sized electric watch, this restricts freedom in design.

In the driving device according to the present invention even though the first rotor is rotated through 180°, the second rotor will rotate only through an angular interval equal to 180° divided by an integral number. In other words, the rotation angle is converted between the first rotor and the second rotor. In FIGS. 1 to 4, the parts designated by the same reference numerals are all the same. In FIG. 3, the first rotor (2) has two magnetic poles in the diametral direction as in the conventional rotor and is disposed completely within the coil (M). On the other hand, the second rotor (4) is magnetized with four poles as shown in the figure.

Figure 3A:
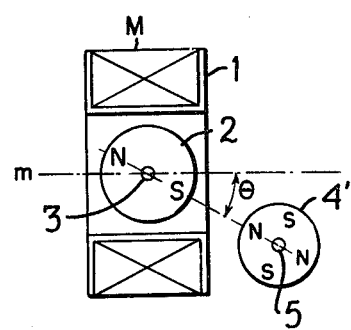
FIGS. 3(a) and 3(b) illustrate an electric driving device according to the present invention.
Figure 3B:
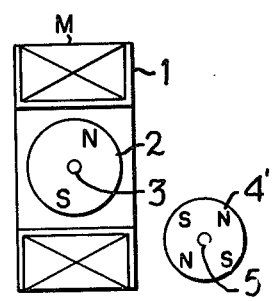

The operation of the driving device is as follows: FIG. 3(a) shows the case when the coreless field coil (M) is not excited with a current and the rotors are at rest, making different magnetic poles appear opposite to each other. When an excitation current is impressed, a magnetic flux is produced in the coreless field coil (M) in the magnetic field central direction (m), and through an interaction with the magnetic flux of the first rotor (2), the first rotor (2) begins to rotate clockwise as determined by the angle $\theta$. Then, the second rotor (4) rotates counterclockwise due to the magnetic force of attraction with the first rotor (2), and when passing through the position of FIG. 3(b), the N-pole of the first rotor (2) and the S-pole of the second rotor (4) are mutually attracted, coming to rest at the position shown in FIG. 3(a). Namely, the first rotor (2) makes a step-rotation of 180° per unit time in response to an impressed alternating positive and negative excitation current, whereas the second rotor (4) undergoes rotation only by 90°. Moreover, because the respective axes of rotation of the first rotor (2) and the second rotor (4) lie on a straight line which is non-colinear with the axial dimension of the coreless coil (M), the device is self-starting.

Figure 4:
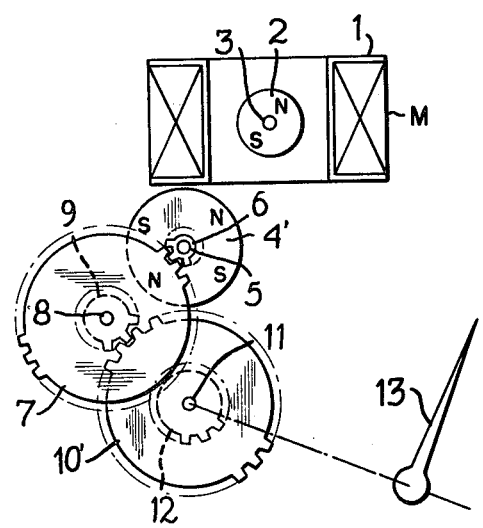
FIG. 4 illustrates another embodiment of the electric driving device according to the present invention and shows it incorporated in a timepiece.

FIG. 4 shows an electric timepiece wherein the driving device of this invention is incorporated. In this case, the reduction ratio of a wheel train down to the second rotor (4) is half the reduction ratio of the case of FIG. 2, that is, 1:15. In short, in the case of FIG. 4 a second-hand wheel half the size of that shown in FIG. 2 suffices and enables a small-sized electric timepiece to be realized. Also in the case of FIG. 4, since the circumferential length between the magnetic poles of the first rotor (2) is taken to be equal to that between the magnetic poles of the second rotor (4), it is possible to eliminate the slip phenomenon between each of the rotors, so that the rotation can be smooth.

In the above-mentioned embodiment a description was made of the case when the first rotor is bipolar and the second rotor is quadrupolar, but if a larger angular reduction is required, the number of magnetic poles of the second rotor may be increased as required. Moreover, we may also obtain other embodiments in which the first rotor has an odd number of pole pairs, and the second rotor has a greater number of poles than the first rotor. The first rotor is required to have an odd number of pole pairs because of the particular location of the first rotor completely within the coreless coil. If the first rotor has an even number of poles pairs the respective forces developed by the pole pairs interacting with the magnetic field of the coreless coil will be equal in magnitude and opposite in direction so that the forces will cancel and there will be no net force to cause rotation. If there are an odd number of pole pairs there will be a non-zero net force causing the first rotor to rotate. In addition, though the rotors have been considered to be of disk form, it is possible to execute this invention by making the magnetic poles projections and, in case of a two-pole rotor such as the first rotor of FIG. 3, by using a bar magnetic instead of a disk-shaped magnet.

What is claimed is:

1. An electronic driving device, comprising; a coreless coil energizable by an electric current for developing a magnetic field along an axial dimension of said coreless coil; a first magnetized rotor disposed completely within said coreless coil and mounted for rotation within said coreless coil and having a plurality of circumferentially equi-spaced magnetic poles; a second magnetized rotor mounted for rotation externally of said coreless coil and positioned relative to said first rotor for magnetic coupling therewith and having a plurality of circumferentially equi-spaced magnetic poles, said first and said second rotors having respective axes of rotation defining therebetween a straight line non-colinear with the axial dimension of said coreless coil and intersecting the axial dimensions of said coreless coil, and wherein said second magnetized rotor has a greater number of magnetic poles than the number of magnetic poles of said first magnetized rotor.

2. An electric driving device as claimed in claim 1, wherein said first magnetized rotor has two diametrically opposed magnetic poles, and said second magnetized rotor has four circumferentially equi-spaced magnetic poles.

3. An electric driving device as claimed in claim 1, wherein a circumferential distance between successive poles of said first magnetized rotor is substantially equal to a circumferential distance between successive poles of said second magnetized rotor.

4. An electric driving device as claimed in claim 1, wherein said second magnetized rotor includes a gear concentric with the axis of rotation of said second rotor for driving a gear train upon rotation of said second rotor.

5. An electric driving device as claimed in claim 1, wherein said first magnetized rotor has two diametrically opposed poles and said second magnetized rotor has four circumferentially equi-spaced magnetic poles, in combination with a gear train comprising a first pinion mounted for rotation with said second rotor, an intermediate gear engaging said first pinion, a second pinion mounted for rotation with said intermediate gear, a second-hand gear engaging said second pinion, and a second-hand mounted for rotation with said second-hand gear, and wherein the reduction ratio of said gear train between said second rotor and said second-hand is 1:15.

* * * * *